US008006786B1

(12) United States Patent
Chapman

(10) Patent No.: US 8,006,786 B1
(45) Date of Patent: Aug. 30, 2011

(54) PERSONAL STANDING PLATFORM FOR MOTORIZED WHEEL CHAIR

(76) Inventor: Judi Chapman, Dixon, CA (US)

(*) Notice: Subject to any disclaimer, the term of this patent is extended or adjusted under 35 U.S.C. 154(b) by 414 days.

(21) Appl. No.: 12/218,244

(22) Filed: Jul. 14, 2008

(51) Int. Cl.
*B60K 1/00* (2006.01)
*B62D 63/00* (2006.01)

(52) U.S. Cl. .................... 180/65.1; 280/32.7; 280/304.1

(58) Field of Classification Search ................. 180/19.1, 180/65.1, 11; 280/87.041, 32.7, 493, 47.34, 280/304.1, 47.17, 47.18, 400
See application file for complete search history.

(56) References Cited

U.S. PATENT DOCUMENTS 3,485,314 A * 12/1969 Herr ............................ 180/19.1
3,567,242 A * 3/1971 Miller ...................... 280/87.041
4,073,500 A * 2/1978 Campeau ................ 280/87.041
4,096,920 A * 6/1978 Heyn ............................. 180/11
4,163,393 A * 8/1979 Gutierrez et al. ............... 73/584
5,213,350 A * 5/1993 Hermanson .................. 280/32.6
5,947,505 A * 9/1999 Martin .......................... 280/493
6,273,444 B1 * 8/2001 Power ........................ 280/304.1
6,443,252 B1 * 9/2002 Andes .......................... 180/65.1
6,540,238 B2 * 4/2003 Yang ............................ 280/32.7
6,637,760 B1 * 10/2003 Carman ....................... 280/32.7
6,651,993 B1 * 11/2003 Emerzian et al. .......... 280/47.34
7,300,061 B1 * 11/2007 Omstead ...................... 280/32.7

* cited by examiner

*Primary Examiner* — Hau Phan
(74) *Attorney, Agent, or Firm* — Mark C. Jacobs

(57) ABSTRACT

A passenger standing platform for attachment to a mobility vehicle that provides improved support for the rider, increased weightload, and easy mountability and storage capability, The unit has a paddle shape platform base with 3 fully rotating caster assemblies attached to its underside in a triangular configuration and a non-skid mat attached to its obverse side. The platform base is hingedly attached to a mount plate that connects to the mobility vehicle, and is retained in a non-use generally vertical position off the ground by a pair of spaced coil springs attached at opposite ends to the mount plate and to the platform base.

10 Claims, 3 Drawing Sheets

PERSONAL STANDING PLATFORM FOR MOTORIZED WHEEL CHAIR

FIELD OF THE INVENTION

The invention relates to a releasably detachable wheelchair attachment and more particularly to a passenger carrying platform supported by three spaced swivel casters, none of which are connected to any other caster.

KNOWN PRIOR ART

Andes, U.S. Pat. No. 6,443,252 was issued on Sep. 3, 2002. The device of the only prior art patent known to applicant lacks the sophistication of the instant device. It has only two wheels, mounted on an axle, and as such, the wheelchair occupant must take special care in both making left and right turns, and especially when backing up. The backing up experience either with or without a passenger on the platform is akin to backing up a truck or car with a fixed axle trailer attached. Not for the faint of heart.

In addition to Andes, the axle that carries the two wheels is disposed beneath the rear of the platform such that when the platform is occupied, there could arise a warping or deformation of the platform, due to the stress placed on the specific tongue used to attach the trailer-platform

BACKGROUND OF THE INVENTION

Wheelchairs, particularly self-powered wheelchairs, such as those powered by a battery and a motor are widely used by individuals who have limited mobility. People who are disabled or otherwise immobilized due to disease or injury to one or both legs. A: use either a motorized wheelchair or an electric scooter. The invention of this application may be attached to either of said mobility devices. A motorized wheel chair costs more than a scooter, is commanded directionally by a multi-directional joy stick and is powered generally by two motors that operate together as well as separately. A scooter has handlebars interconnected to a pivot-able single front wheel to control left and right movement and is powered.

When a person is walking side by side with a motorized wheelchair operating at full speed, the person walking may have difficulties in keeping up with the speed of the wheelchair, therefore is under a high degree of stress when they have to keep up with the speed of the motorized wheelchair and the distance traveled.

There have been previous inventions of a standing platform to be attached to the back of a powered wheelchair, however, such platforms are only equipped with limited number of wheels (two or less). If the rear wheels are poorly positioned at the rear end of the platform and no wheel in the front of the platform, the weight of the standing person would deform the platform and cause a warping or deformation in the rear of the platform and increased weight on the tongue of the platform that connects to the rear of the wheelchair, eventually disabling the mobility of the standing platform.

It is therefore an object of the present invention to provide a standing platform for a motorized wheelchair that is equipped with at least three 360 degree swivel wheels mounted to the bottom surface of the platform.

DEFINITIONS

The term "PSP" as used herein means personal standing platform.

The term "motorized vehicle" as used herein, pertains to a motorized wheelchair or a two handled battery powered scooter.

The term "towing vehicle" shall be used interchangeably with motorized vehicle.

SUMMARY OF THE INVENTION

There is disclosed a releasably detachable passenger standing platform that attaches behind a motorized wheelchair or scooter onto the mounting means for the stabilizer wheels. These are the little wheels mandated to prevent the wheelchair or scooter from tipping backward on a hill or for some other reason when the load becomes unbalanced. The platform may be tilted up when not in use The platform has 2 trailing swivel casters and one leading centrally disposed swivel caster mounted to the underside of a rearwardly elongated platform sized to accommodate an adult person. The ability to ride short or long distances on the standing platform permits the companion, spouse, care giver or child of the vehicle operator to maintain the pace of the vehicle operator for extended periods of time.

It is a first object therefore to provide a spring loaded passenger platform that attaches semi-permanently to the rear of a motorized wheelchair or scooter.

It is a second object to provide a passenger standing platform that has a trio of 360 degree swivel casters, mounted on the underside of a platform.

It is a third object to provide a passenger standing platform hereinafter (PSP) that while fully attached to the vehicle, is also spring loaded to move from a first horizontal position to a second vertical position by a gentle foot nudge or even by the finger of a teenager.

It is fourth object to provide a PSP that will not buckle under the stress of being towed with a passenger in place, at speeds up 10 mph, by a motorized vehicle.

It is a fifth object to provide a "PSP" for a motorized vehicle that permits the operator of the motor vehicle, to maintain his/her operating speed.

Other objects of the invention will in part be obvious and will in part appear hereinafter.

The invention accordingly comprises the device possessing the features, properties and the relation of components which are exemplified in the following detailed disclosure and the scope of which shall be indicated in the appended claims.

For a fuller understanding of the nature and objects of the invention, reference should be made to the following description taken in conjunction with the accompanying drawings.

DESCRIPTION OF THE PREFERRED EMBODIMENT

Figure 1:
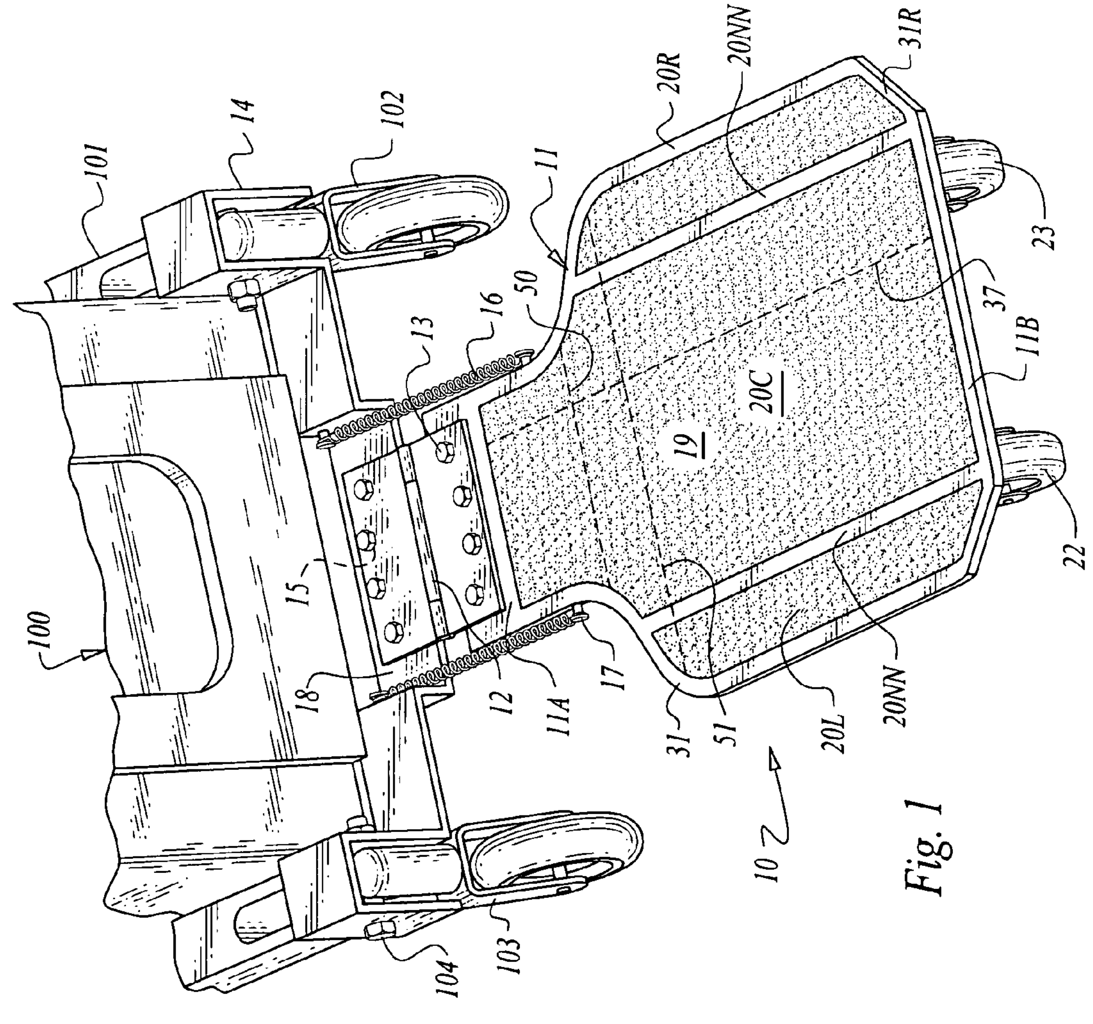
FIG. 1 is rear top perspective view of the device of this invention.

Let us first turn to FIG. 1, where the passenger standing platform, the invention 10 is seen attached to a mobility vehicle 100, here a motorized wheelchair of a conventional nature. Such chairs are sold by several vendors, the most popular brand of which is Quickee. All elements of the invention will be cast in 2 digit numbers while those of the mobility vehicle will be in the 3 digit series.

The device 10 includes a platform base 11 that is configured like a ping pong paddle in that it has a forward narrower section 11A and a wider elongated section 11B connected by a trapezoidal intermediate section 11C. See FIG. 2, wherein imaginary lines of demarcation for the intermediate section 11C are set out by dashed lines 50 and 51. Rear section 11B may have square corners, chamfered corners, or tapered corners as shown here and designated 31R in FIGS. 1 & 2. While shown with oblique rounded or chamfered rear corners for the rear section 11B, the corners need not be so configured. Of course a sharp 90 degree rear corner is to be avoided since a person will be entering and exiting the unit at different frequencies as events unfold.

Figure 4:
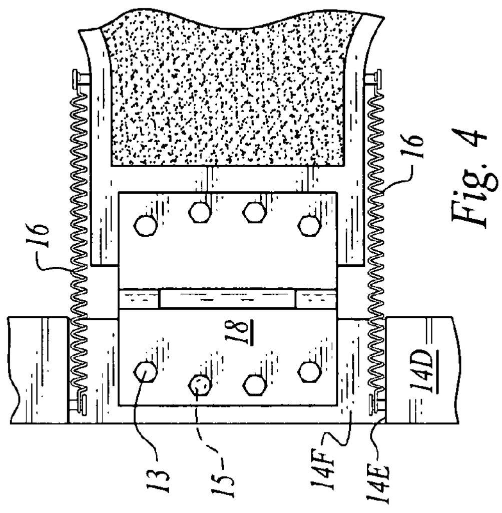
FIG. 4 is a top plan closeup view of the spring loaded components of this device to raise it from a first in use to the second storage position.

As seen here, the platform base 11 is almost entirely covered with an anti-skid self adhesive mat. The mat 19 is seen to have a main or central section 20C and a pair of mirror image side sections 20L, 20R the latter which are confined to portion 11B, while the main part of the mat 20C extends from the elongated section 11B to the narrower leading section 11A. See also FIG. 2 and FIG. 4. Each of the segments 20R and 20L are separated from the main segment 20C, by a non nonstick stripe 20NN the runs from the oblique edge 31 to the rear of the platform base. This stripe is built into the non-skid attachment as purchased from vendor, 3M Company. While the mat 19 has been described as having 3 segments, in point of fact it is two somewhat mirror image segments cut to shape from rectangular stock that has the non nonstick stripe incorporated therein. The line 37 designates the abutment of the two sections of the mat 19 that appears as 3 segments 20C, 20L, and 20R.

Platform base 11 has a conventional door hinge half 12 transversely attached via 3 bolts 13 disposed in unnumbered throughbores of the forward or leading section 11A and aligned un-numbered bores found in the hinge half. The other hinge half is attached in like manner by similar bolts 13 through aligned unnumbered bores in the cover plate 15 and the center segment of the double U mount plate 14, which plate 14 will be described infra. In essence the forward hinge half 12 is sandwiched between the cover plate 18 and segment F of the double U mount plate.

Figure 2:
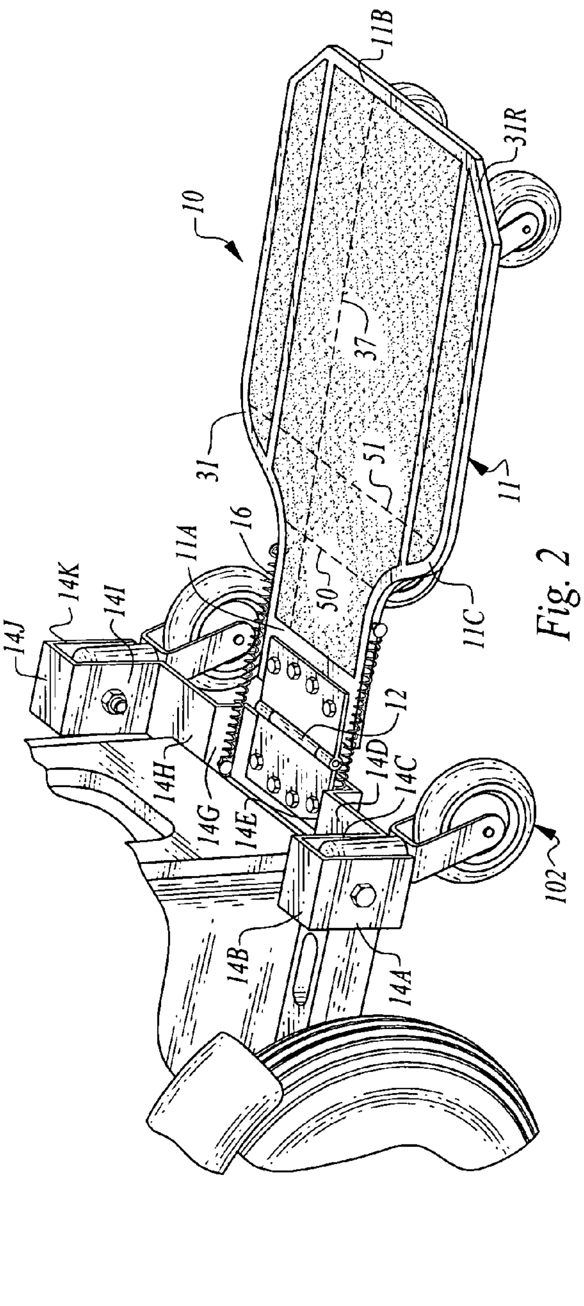
FIG. 2 is a side perspective view of the device of this invention, mounted to a motorized vehicle.

While the mount plate is seen in FIG. 1, it is seen better in full in FIG. 2. The mount plate is referred to as a Double U mount plate because the segments form two inverted U shape members on the two ends of the plate. Reference should simultaneously be made to FIGS. 3 and 4 as well.

The mount plate which is an integrated unit of equal depth front to back, commences with an upwardly disposed segment 14A, connected to a first horizontal segment 14B that overlies a first anti-tip wheel 102. A segment of substantially the same extension downward, 14C commences from 14B's second end to form a first inverted U. At the lower terminus of 14C, a second horizontal segment 14D, extends inwardly toward the middle of the vehicle. At the second terminus of segment 14D there is a small downward descending segment 14E, per FIG. 4, which at its lower terminus connects to center segment 14F.

Segment 14G is a mirror image of 14 E, segment 14H is a mirror of 14D, and segments 14 I,14 J and 14 K are mirror images of 14A,14B and 14C and form the second inverted U overlying the right anti-tip wheel.

A pair of spaced coil springs 16 are each attached at one end thereof to a respective stand off 17 disposed on the oblique edge 31F of the platform base 11. The other end of the respective coil spring is disposed in a bore 18 in section 14 F. See FIG. 4 Since the tension pressure of the springs utilized is chosen to be greater than the pressure to keep the hinge open, the platform base stays in the upright non-use position until moved from the generally vertical storage position to the in-use horizontal position by the pressure of one or two fingers of an adult. The mirror image oblique edges 31 define a trapezoidal section 11*c* disposed between the wider and longer section 11B and the narrower and shorter section 11A.

Figure 3:
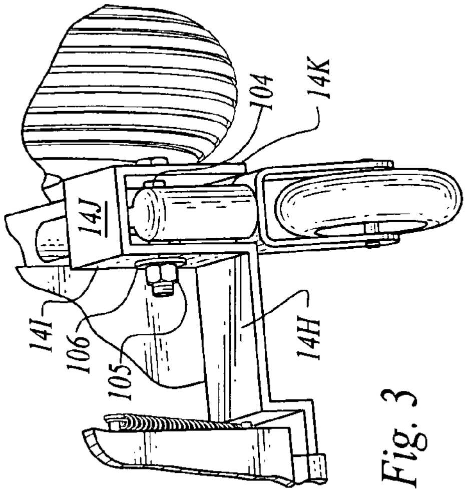
FIG. 3 is a closeup perspective view of the mounting means of this invention to a towing vehicle.

FIG. 3 is a closeup view of the right side inverted U consisting of segments 14 K, 14J and 14 J and the adjoining segment 14H. Bolt 104 is seen extending between segments 14K and 14I through unnumbered aligned bores. The bolt 104 is retained by a lock washer 106 and two nuts 105. The same retention means is also utilized for the opposite inverted U not seen that overlays the left anti-tip wheel 102 of the mobility vehicle.

Figure 7:
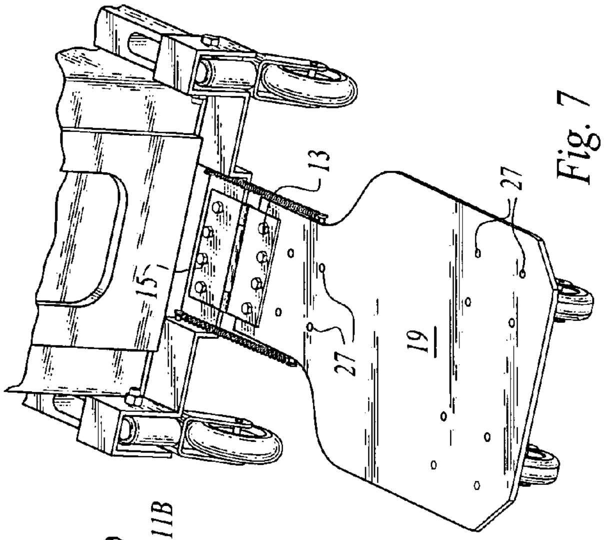
FIG. 7 is a top perspective view of the platform portion of the device prior to the addition of the non-skid surface.
Figure 5:
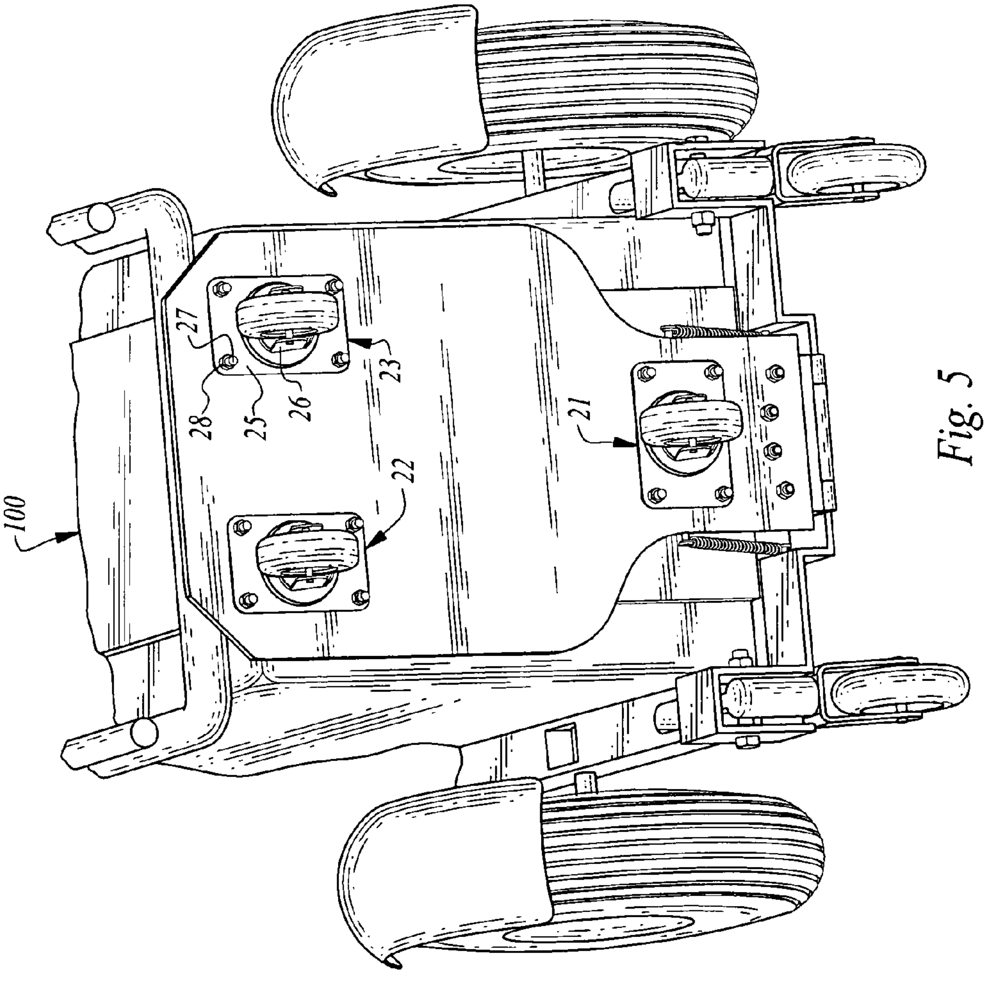
FIG. 5 is a bottom elevational view of the passenger standing platform of this invention stored in its upright position.

In FIG. 5, the underside of the platform base 11 is seen. Here 3 caster assemblies 21, each of which is not connected to another caster assembly, are seen with one assembly 21 in the leading area and 2 in the trailing part of the platform base. Each caster assembly 21 includes a rectangular flat plate 25 for mounting, to which is rotatably attached conventional housing 26 and wheel 26W. Each flat plate 25 has a through bore unnumbered in each corner. A set of spaced 4 bolts 27, are disposed under the mat 19. All of said bolts pass through a set of bores in platform base 11, also not seen, and through the corner bores of plate 25. These 4 bolts are retained by a pair of nuts 28 on each bolt end. Reference is made to FIG. 7 and the discussion infra. Note that in this FIGURE, FIG. 5 the passenger standing platform device is disposed in a vertical position in this figure.

Figure 6:
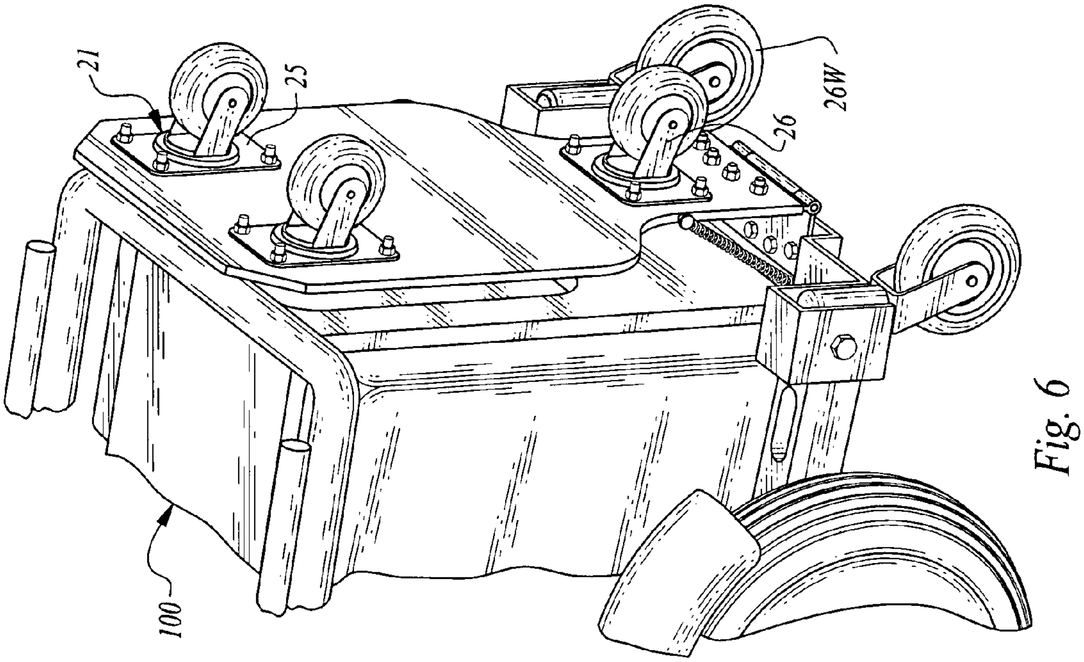
FIG. 6 is a side elevational view of the passenger standing platform shown in FIG. 5.

In FIG. 6, the platform base 11, is shown in the vertical position of FIG. 5 is seen from the side. The reader's attention is called to the fact that the platform base tilts forwardly about 30 degrees toward the body of the mobility vehicle 100, due to the fact that the coil springs when in the relaxed position, retain the platform base pitched forwardly for ease of storage and mobility of the vehicle. The springs eliminate the need for any type of locking mechanism to retain the device in the upward non-use position.

In FIG. 7, In this FIGURE, the platform base 11 is seen disposed horizontally, that is in the in-use position. Here the bolt heads 27 are seen to be recessed flush with the surface of the platform 11. All 12 bolt heads are seen in the rectangular pattern corresponding to the locale of each caster assembly 21. The two caster wheels 26W of the side by side mounted rear caster assemblies 21 are also visible.

The passenger standing platform is elevated approximately 4 inches from ground level, such that a person of any age can easily step on and step off of the device of this invention. In embodiments of the device, the width of section 11A ranges from 7 to about 9 inches, while the larger section of the platform ranges from about 10 to 13 inches. The overall length from the hinge rearward may vary from 11 to 15 inches. By using high strength aluminum or steel for the platform and heavy duty caster assemblies, the instant device can be constructed to carry persons of up to 400 lbs in weight. Other suitable materials include plastic such as polycarbonate, and resin reinforced glass fibers. The coil springs utilized have about a 7 lb pressure and have 0.5 inch diameter coils. The hinge employed is a variable pressure hinge available from Stanley Tool Works and other vendors. The operating range may be set from 10 to 25 lbs of pressure, and as utilized the pressure is set at 10 lbs. When detached by removing the two bolts 109 that hold the framework to the anti-slip wheels of the mobility vehicle it is seen that the passenger standing platform weighs about 10 pounds, not including the double inverted U mount plate.

It has been found that since the center of gravity of the device of this invention is on the rear two caster assemblies, when occupied, there is little or no effect on the speed achievable by the mobility vehicle. Thus speeds of up to 10 MPH for a Quickee Model SE-646 have been recorded when the occupant on the device weighed over 150 lbs. On the other hand when the platform is occupied, depending upon the vehicle employed, speeds constituting a slow crawl of say 2 mph, the speed of foot traffic at Epcot Center in Florida, or 5$^{th}$ Ave. In NYC have also been recorded for this same unit.

While removal of the mount plate bolts is the easiest way to remove the entire device, the cover plate over the hinge and the removal of the 4 bolts is also a mode of separation of the device from the mobility vehicle. Both are within the skill of the art.

Figure 8:
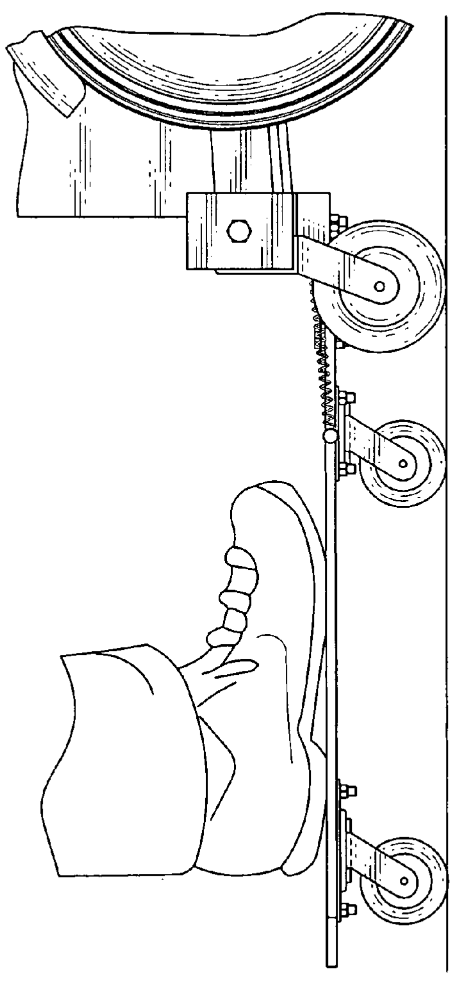
FIG. 8 is a s right side perspective view showing an occupant standing on the passenger standing platform of this invention.

FIG. 8 is a side perspective view showing a passenger standing on the device of this invention. Since the device has been fully described, suffice it to say that the platform can be lowered from the position shown in FIG. 5, vertical to the in use horizontal position merely by the use of the tip of one's shoe or by the use of two fingers from a bending position.

It is seen that the device of this invention affords a very safe environment for an occupant, as the user is only about 4 inches off the ground and has plenty of room to place both feet firmly on the platform. The device maximizes weight distribution, provides increased load capacity, and provides greater stability for the user, coupled with increased navigational control by the "driver" of the mobility vehicle, especially when backing up with the device down in the in use position, as well as when riding with no occupant. With the present invention, two individuals can comfortably ride together whether through the Atlanta Hartsfield airport, or any theme park, or just for a stroll in the neighborhood after dinner, without the companion fighting to keep up with the speed of the mobility vehicle driver, or the vehicle driver having to slow down to keep up with the walking companion.

Clearly both parties, the driver and the rider, are benefited by the use of this invention.

While only a motorized wheelchair is featured in the drawings, the device works equally as well with a scooter and is readily mounted thereto by a person possessing minimum skill.

Since certain changes may be made in the above device without departing form the scope of the invention herein involved, it is intended that all matter contained in the above description and shown in the accompanying drawings shall be interpreted as illustrative and not in a limiting sense.

I claim:

1. A passenger standing platform for a motorized mobility vehicle which comprises a platform base having an obverse side and an underside, which platform base is supported by a trio of caster assemblies mounted to the underside of said platform base, said platform base being hingedly attached by a single centrally disposed hinge to the center of a mount plate, which mount plate is readily attachable by bolts to the anti-flip wheels of a personal motorized mobility vehicle and which platform base is also connected to said mount plate by a pair of spaced springs, one on either side of the hinge which springs retain the platform base in a generally vertical non-use position, but which platform can be lowered to its in use horizontal position by the slight pressure of the fingers to elongate the springs whereby when said platform is lowered, a driver of a personal mobility vehicle can also transport a standing second passenger.

2. The device of claim 1, wherein the obverse side of said platform base carries a non-skid mat.

3. The passenger standing platform of claim 2 wherein the platform has a wider rear portion and a narrower front portion, and wherein the three casters assemblies on the underside are mounted in a triangular pattern, two casters on the wider rear portion, and one caster on the narrower front portion, and each caster wheel is able to move horizontally 360 degrees.

4. The device of claim 2, wherein the platform has a pair of spaced narrow bands running rearwardly the length of the wider portion of the platform, which bands separate segments of the non-skid mat.

5. The passenger standing platform of claim 1 wherein the platform base is fabricated from a member consisting of steel, aluminum, resin reinforced glass fiber, and plastic.

6. The device of claim 1, wherein the movement of the platform base from its in use horizontal position to a non-use generally vertical position can be accomplished by two fingers, and once moved to the non-use position, the platform base will remain generally vertical until moved to the horizontal position by the use of two finger pressure downward to elongate the springs.

7. The device of claim 1 wherein all 3 casters are capable of 360 degree horizontal movement and are all the same size.

8. A passenger standing platform for a motorized mobility vehicle which comprises a platform base having an obverse side and an underside, which platform base has a narrower front portion and a wider rear portion, and is supported by a trio of caster assemblies mounted to the underside of said platform base, said platform base being hingedly attached by a single hinge to a mount plate, which mount plate is readily attachable by bolts to the anti-skid wheels of a personal motorized mobility vehicle yet permits full 360 degree horizontal movement of said anti-skid wheels, and which platform base is also connected to said mount plate by a pair of spaced relaxed springs, which retain the platform base in a generally vertical non-use position, but which platform can be lowered to its in use horizontal position by the slight pressure of the fingers, wherein the obverse side of the platform base is covered with a non-slip mat, and the caster assemblies are arranged in a triangular pattern on the underside of said platform base, one caster forward, and two casters rearwardly whereby when said platform is attached to a personal motorized mobility vehicle, both a driver of said vehicle and a passenger on said platform can be transported.

9. The passenger standing platform of claim 8 wherein the platform base is fabricated from a member consisting of steel, aluminum, resin reinforced glass fiber, and plastic.

10. The device of claim 8 wherein all 3 casters are capable of 360 degree horizontal movement and are all the same size.

* * * * *